United States Patent
Cruz Torres et al.

(10) Patent No.: US 12,131,135 B2
(45) Date of Patent: Oct. 29, 2024

(54) METHOD AND A SYSTEM FOR THE AUTOMATIC GENERATION OF AN EMBEDDED SOURCE CODE FOR THE ELECTRONIC CONTROL UNIT OF AN AD/ADAS ROAD VEHICLE

(71) Applicant: IVEX, Heverlee (BE)

(72) Inventors: Mario Henrique Cruz Torres, Heverlee (BE); Hoang Tung Dinh, Heverlee (BE)

(73) Assignee: IVEX, Heverlee (BE)

( * ) Notice: Subject to any disclaimer, the term of this patent is extended or adjusted under 35 U.S.C. 154(b) by 0 days.

(21) Appl. No.: 17/505,801

(22) Filed: Oct. 20, 2021

(65) Prior Publication Data

US 2022/0137932 A1 May 5, 2022
US 2024/0078090 A9 Mar. 7, 2024

(30) Foreign Application Priority Data

Nov. 5, 2020 (BE) .................................. 2020/5791

(51) Int. Cl.
*G06F 9/44* (2018.01)
*G06F 8/30* (2018.01)
*G06F 8/34* (2018.01)
*G06F 8/41* (2018.01)
*G06F 9/445* (2018.01)
*G06F 9/455* (2018.01)

(52) U.S. Cl.
CPC .................. *G06F 8/30* (2013.01); *G06F 8/34* (2013.01); *G06F 8/42* (2013.01)

(58) Field of Classification Search
CPC ................. G06F 8/30; G06F 8/34; G06F 8/42
See application file for complete search history.

(56) References Cited

U.S. PATENT DOCUMENTS

| | | | |
|---|---|---|---|
| 9,459,840 B1 * | 10/2016 | Yu | G06F 8/20 |
| 11,036,370 B2 * | 6/2021 | Adenwala | H04W 4/44 |
| 11,048,487 B1 * | 6/2021 | Mestchian | G06F 8/75 |
| 2017/0039039 A1 * | 2/2017 | Johnson | G06F 11/3608 |
| 2017/0339034 A1 * | 11/2017 | Lin | H04L 47/12 |

(Continued)

FOREIGN PATENT DOCUMENTS

| | | | | |
|---|---|---|---|---|
| CN | 110462544 A | * | 11/2019 | ........ B60W 60/0011 |
| CN | 111831267 A | * | 10/2020 | ............. G06F 30/30 |

(Continued)

OTHER PUBLICATIONS

Vassil Todorov, Formal verification of automotive embedded software, 2018, pp. 84-87. https://ieeexplore.ieee.org/stamp/stamp.jsp?tp=&arnumber=8536209 (Year: 2018).*

(Continued)

*Primary Examiner* — Mongbao Nguyen
(74) *Attorney, Agent, or Firm* — Jerold I. Schneider; Schneider IP Law

(57) ABSTRACT

A computer-implemented method and a system for the automatic generation of an embedded source code for the electronic control unit of an Autonomous Driving/Advanced Driving Support System (AD/ADAS) road vehicle where the AD/ADAS road vehicle has system requirements and where situation/states leading to the inconsistences in the system requirements are displayed.

6 Claims, 1 Drawing Sheet

(56) References Cited

U.S. PATENT DOCUMENTS

| | | | |
|---|---|---|---|
| 2019/0179727 A1* | 6/2019 | Bouissou | G06F 11/3604 |
| 2020/0034354 A1* | 1/2020 | Horita | B60R 16/0231 |
| 2020/0183676 A1* | 6/2020 | Sakurai | H04L 67/34 |
| 2020/0249913 A1* | 8/2020 | Pendharkar | G06F 8/427 |
| 2021/0012658 A1* | 1/2021 | Avedisov | G08G 1/096708 |
| 2021/0061278 A1* | 3/2021 | Zhao | G01C 21/3492 |
| 2021/0107499 A1* | 4/2021 | Brännström | B60W 50/045 |
| 2022/0084332 A1* | 3/2022 | Arechiga Gonzalez | G07C 5/0808 |

FOREIGN PATENT DOCUMENTS

| | | | | |
|---|---|---|---|---|
| DE | 102018222086 A1 * | 6/2020 | | |
| JP | 2013077048 A * | 4/2013 | | |
| JP | 2020074191 A * | 5/2020 | | B60R 16/02 |
| KR | 20190123250 | 10/2019 | | |

OTHER PUBLICATIONS

Usha Sreeram, Automated Generation and Integration of AUTOSAR ECU Configurations, 2019, pp. 1-86. https://scholar.uwindsor.ca/cgi/viewcontent.cgi?article=9154&context=etd (Year: 2019).*

Roberto Passerone, A Methodology for the Design of Safety-Compliant and Secure Communication, 2019, pp. 125022-125035. https://ieeexplore.ieee.org/stamp/stamp.jsp?tp=&arnumber=8812663 (Year: 2019).*

Siby Jose Plathottam, Next Generation Distributed and Networked Autonomous Vehicles: Review, 2018, pp. 577-581. https://ieeexplore.ieee.org/stamp/stamp.jsp?tp=&arnumber=8328277 (Year: 2018).*

Sarangi Veermani Lekamani, Model Based Systems Engineering Approach to Autonomous Driving, 2018, pp. 1-85. http://kth.diva-portal.org/smash/get/diva2:1335887/FULLTEXT01.pdf (Year: 2018).*

Karel Kubicek, Continuous enhancement in model-based software development and recent trends, 2019, pp. 71-78. https://ieeexplore.ieee.org/stamp/stamp.jsp?arnumber=8869237 (Year: 2019).*

Yasin Firat Payalan, Towards Next-Generation Vehicles Featuring the Vehicle Intelligence, 2020, pp. 30-43. https://ieeexplore.ieee.org/stamp/stamp.jsp?arnumber=8734737 (Year: 2020).*

Nesredin Mahmud, ReSA Tool: Structured Requirements Specification and SAT-based Consistency-checking, 2016, pp. 1737-1746. https://ieeexplore.ieee.org/stamp/stamp.jsp?tp=&arnumber=7733488 (Year: 2016).*

Francisco J. Belmonte, Overview of Embedded Systems to Build Reliable and Safe ADAS and AD systems, 2020, pp. 1-12. https://ieeexplore.ieee.org/stamp/stamp.jsp?tp=&arnumber=8995493 (Year: 2020).*

English translation, Yamamoto (CN 111831267 A), 2020, pp. 1-9. (Year: 2020).*

John Heneghan, Enabling Security Checking of Automotive ECUs with Formal CSP Models, 2019, pp. 1-8. https://ieeexplore.ieee.org/stamp/stamp.jsp?tp=&arnumber=8805994 (Year: 2019).*

Vassil Todorov, Formal verification of automotive embedded software, 2018, pp. 1-4. https://ieeexplore.ieee.org/stamp/stamp.jsp?tp=&arnumber=8536209 (Year: 2018).*

English translation, Shalev-Shwartz (CN 110462544 A), 2019, pp. 1-64. (Year: 2019).*

Zhang Xizhe et al—Scenario Description Language . . . 2020 IEEE Internatonal Conference, Oct. 11, 2020.

Dinh Hoang Tung et al—Sound and Complete Reactive UAV Behavior, On-Line Sep. 1, 2017.

Search Report for Priority Application (note last several pages are in English).

* cited by examiner

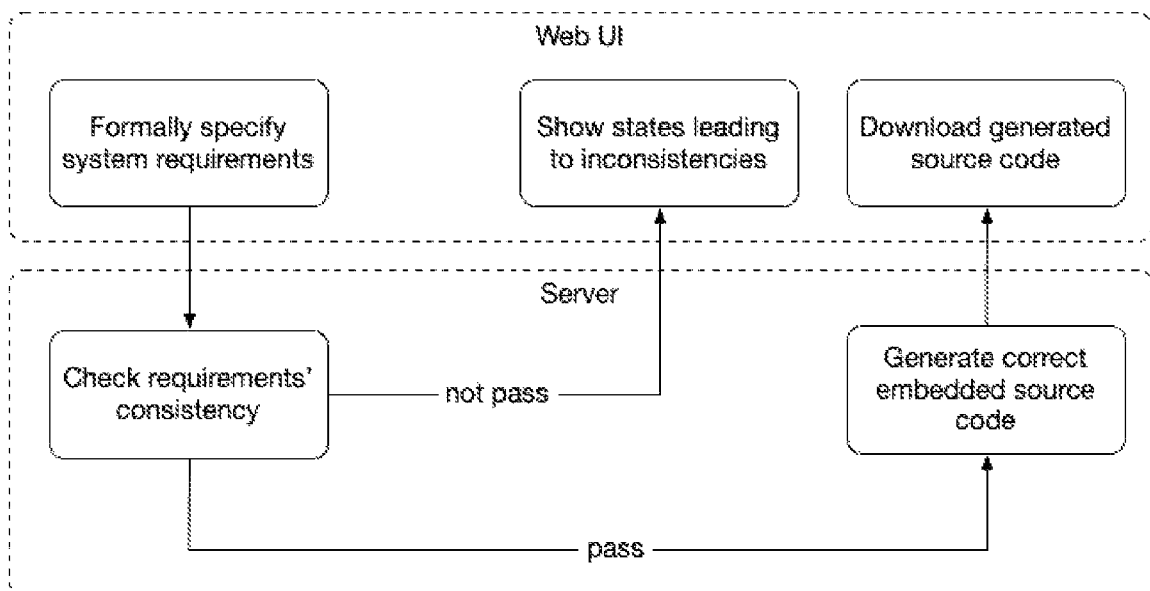

METHOD AND A SYSTEM FOR THE AUTOMATIC GENERATION OF AN EMBEDDED SOURCE CODE FOR THE ELECTRONIC CONTROL UNIT OF AN AD/ADAS ROAD VEHICLE

BACKGROUND

Increasing the safety of autonomous road vehicles, in particular of ADAS (Advanced Driving Support System) and AD (Autonomous Driving), is of utmost importance. Thereby, driving specifications are defined for safe use of road vehicles which then are translated into an execution policy for AD/ADAS road vehicles. Implementation errors in the translation are a major concern. Therefore, an automated code generation has been proposed in the context of unmanned aerial vehicles (UAV), see: "Sound and Complete Reactive UAV Behavior using Constraint Programming" by Hoang Tung Dinh, Mario Henrique Cruz Torres, Tom Holvoet, imec-DistriNet, KU Leuven, 3001 Leuven, Belgium.

However, this method only describes a behavior specification method for UAVs. There is therefore a general need to provide methods and systems that allow for a reduction in implementation errors and an increased implementation speed also for road vehicles.

Moreover, the method from the "Sound and Complete UAV Behavior using Constraint Programming" article only describes a behavior generation method for UAV where the behavior is represented as a decision making policy, that is, a look-up table mapping each possible state to a set of actions that the UAV can execute, without any concrete method for an implementation on embedded computers. There is therefore a need to provide methods and systems that generate the behavior in an embedded hard-real time source-code.

SHORT DESCRIPTION OF THE INVENTION

The inventors now have surprisingly found that the automated generation of embedded source codes from a driving specification lowers the representational gap between safety requirements and the software deployed in an electronic control unit (ECU) of an AD/ADAS road vehicle. Such methods and systems allow for a reduction in implementation errors and an increased implementation speed.

Accordingly, a first aspect of the invention is a computer-implemented method for generating an embedded source code for the electronic control unit of an AD/ADAS road vehicle comprising the following steps of
  a. Providing a driving specification and a formal language to specify the system requirements of an AD/ADAS road vehicle;
  b. Checking the syntax of the driving specification;
  c. Checking the consistency of the driving specification with the system requirements of the AD/ADAS road vehicle;
  d. Generating an embedded source code from the specification; and
  e. Displaying the embedded source code on the graphical user interface,
wherein the embedded source code is generated automatically.

In a preferred embodiment, the system requirements are safety requirements.

In another embodiment, the embedded source code is a C++ source code.

In another embodiment, the embedded source code is generated by applying a two-level logic minimization technique to reduce the computation time of the runtime executable. In another embodiment, the runtime executable has worst-case guarantees concerning its execution time.

In another embodiment, the embedded source code is generated by constructing and solving multiple constraint-satisfaction problems.

In another embodiment, the consistency of the driving specification is checked by checking the infeasibility of multiple constraint-satisfaction problems.

In another embodiment, the embedded source code is generated by constructing and solving multiple automated planning problems.

In another embodiment, the consistency of the driving specification is checked by checking the infeasibility of multiple automated planning problems.

In another embodiment, the embedded source-code is generated from a look-up table mapping each possible discrete state to a set of actions that the road vehicle can execute.

In another embodiment, two-level logic optimization technique is applied to reduce the computation time of the runtime executable compiled from the generated source-code.

In another embodiment, the generated embedded source code receives inputs as discrete state values of the environment.

In another embodiment, the generated embedded source code outputs a set of boolean values representing actions that the road vehicle should execute.

In another embodiment, the method comprises an additional step of displaying an error message, if the syntax of the driving specification of step b is incorrect.

In another embodiment, the method comprises the additional step of displaying an error message, if the driving specification of step c is inconsistent.

In another embodiment, the method comprises an additional step of modifying the driving specification by the user on the user interface.

In another embodiment, the method comprises an additional step of retrieving the embedded source code as a data file.

A further aspect of the invention is a data processing system for generating an embedded source code for the electronic control unit of an AD/ADAS road vehicle comprising means for carrying out the steps of:
  a. Providing a driving specification and a formal language to specify the system requirements of an AD/ADAS road vehicle;
  b. Checking the syntax of the driving specification;
  c. Checking the consistency of the driving specification with the system requirements of the AD/ADAS road vehicle;
  d. Generating an embedded source code from the specification; and
  e. Displaying the embedded source code on the graphical user interface,
wherein the embedded source code is generated automatically.

A further aspect of the invention is a computer program product comprising instructions to cause the computer to perform the steps of the method of the invention.

A further aspect of the invention is a computer-readable medium having stored the computer program product of the invention or the instructions to cause the computer to perform the steps of the computer implemented method of the invention.

A further aspect of the invention is an AD/ADAS road vehicle comprising the system of the invention, a computer program product of the invention or a computer readable medium of the invention.

DETAILED DESCRIPTION OF THE INVENTION

The present invention concerns a method for the automated generation of an embedded source code from a driving specification for AD/ADAS road vehicles. In this respect, "ADAS" means Advanced Driver-Assistance System and "AD" means Automated Driving, sometimes also referred as "ADS" Automated Driving System.

In one embodiment, the formal language specifies one or more of the following:
- the observable states of the environment and the autonomous road vehicle as discrete variables;
- the action that the autonomous vehicle can perform as Boolean variables;
- the condition, or conditions, which must hold during the execution of an action;
- the formal language specifies the condition, or conditions, which is/are expected to hold at the end of the execution of an action;
- the mutual exclusivity of action execution;
- the expected reaction of the autonomous road vehicle when a condition of the observable states holds;
- one or more goals of the autonomous road vehicle as a condition on the observable states;

In another embodiment, the formal language is defined to do one or more of the following actions:
- enforce parallel execution of actions;
- compose different goals in a prioritized order; or
- compose different goals in parallel.

Accordingly, in one embodiment, the methods and systems of the invention are programmed to
- enforce parallel execution of actions;
- compose different goals in a prioritized order; or
- compose different goals in parallel, or a combination thereof.

In another embodiment, a constraint satisfaction problem is constructed from each possible discrete state of the specification.

In another embodiment, a map is generated in which each possible state of the specification is a key of the map and for each key of the map, the corresponding value is a set of actions in the specification.

In another embodiment, a tree-structure is generated in which each possible state of the specification is a node of the tree and for each sequence of nodes, there is a set of leafs in the tree corresponding the a set of actions in the specification.

In another embodiment, the embedded source code is a map container in C++.

In another embodiment, the embedded source code is a function in C++.

In another embodiment, the embedded code is a function in C.

In another embodiment, the embedded code is a function in Rust.

In another embodiment, a system for generating the embedded source code preferably in C++ for a component of an autonomous road vehicle is provided. The system comprises one or more computers, a user interface and a specification. The user interface allows users to write the specification of the component or the system in a formal language comprising the following steps.

Step 1: Specification Syntax Check

In one embodiment, the device is programmed to check the syntax correctness of the input specification. The device is programmed to display error messages on the user interface if the specification is syntactically incorrect.

Step 2: Specification Consistency Check

In a second step, when the specification is syntactically correct, the device is programmed to check for the consistency of the input specification when receiving signal from the user interface.

Step 3: Specification Modification

If the specification is inconsistent, the user interface displays a message to inform the user and also displays one or several situations in which the specification is inconsistent. The user can modify the specification on the user interface.

Step 4: Embedded Source Code Generation

The embodiment includes a subsystem generates an embedded source code preferably in C++ (or C, or Rust) when the specification is consistent.

Step 5: Embedded Source Code Retrieval

After an embedded source code (C++, C, Rust) is generated, the user interface displays a means for users to retrieve the source as one or several files on their computer.

Advantages and Positive Effects

The method and system of the present invention has multiple positive effects. Firstly, it is programmed to detect inconsistencies in system requirements and helps to identify system requirement limitations. Further, it reduces the time of implementing complex decision-making software and the verification time for safety critical software. Finally, the method and system of the present invention—through its automated generation of embedded source codes—eliminates implementation errors and in particular safety-critical errors.

SHORT DESCRIPTION OF THE DRAWINGS

The FIGURE shows a flow chart of the process and system of the present invention.

DETAILED DESCRIPTION OF THE DRAWINGS

The FIGURE shows a flow of the process steps of an exemplary embodiment of the method of the present invention. Users specify the system requirements using a formal language via an interface, like a web interface. A system running on a server checks the consistency of the specified requirements. If a specification does not pass the checks, which means there is at least one inconsistency in the system requirements, the system reports the situations/states leading to the inconsistencies in the system requirements via an output, on the web user interface. If the check passes, the system generates an embedded source code from the system requirements and a user can download the source via the web interface.

The method and system of the present invention thus allows to reflect system requirements in respect of a myriad of potential situations and thus facilitates the implementation of the embedded software.

Moreover, the method and system of the present invention allow during the development phase to refine system requirements and adapt and verify the software in a cost-efficient manner. This is particularly beneficial since system requirements constantly change.

The method and system of the present invention thus facilitate the identification of conflicting system requirements. For example, if a requirement said that the AD/ADAS road vehicle system must change to the left lane, while another requirement said that the AD/ADAS road vehicle must change to the right lane in the same situation, no implementation could be done to satisfy both requirements at the same time.

In another embodiment, the method and system of the present invention allow for the generation of a behavior in an embedded hard-real time source-code. In another embodiment, the methods and systems allow for a reduction in implementation errors and an increased implementation speed.

Finally, the system and method of the present invention enable compliance of the implementation with the system requirements.

The invention claimed is:

1. A computer-implemented method for generating an embedded source code for an electronic control unit of an Autonomous Driving/Advanced Driving Support System (AD/ADAS) road vehicle having system requirements comprising the following steps of:
   a. Providing a driving specification and a formal language to specify the system requirements of an AD/ADAS road vehicle, the driving specification having a syntax;
   b. Checking whether the syntax of the driving specification is syntactically correct or incorrect;
   c.1 when the driving specification is syntactically incorrect, displaying an error message on a graphical user interface;
   c.2 when the driving specification is syntactically correct, checking whether the driving specification is consistent or inconsistent when receiving a signal from the graphical user interface;
   d.1 when the driving specification is inconsistent, displaying a message and a situation in which the specification is inconsistent on the graphical user interface;
   d.2 when the driving specification is consistent, automatically generating an embedded source code from the specification; and
   e. Displaying the embedded source code on the graphical user interface, and retrieving the embedded source code via a web interface,
   wherein the generated embedded source code receives inputs as discrete state values and the embedded source code is generated from a look-up table mapping each possible discrete state to a set of actions that the road vehicle executes and the embedded source code is generated by applying a two-level logic minimization technique to reduce computation time of the runtime executable and two-level logic optimization technique is applied to reduce computation time of the runtime executable compiled from the generated source code,
   during the road vehicle executing the set of actions, wherein the executing actions are mutually exclusive executing actions, conditions of observable states are expected hold, and a tree-structure is generated in which each possible discrete state of the specification is a node of the tree-structure and for each sequence of nodes, there is a set of leaves in the tree-structure corresponding the set of actions in the specification that the road vehicle executes.

2. The method of claim 1, wherein the embedded source code is C, C++, or Rust.

3. The method of claim 1, wherein the embedded source code is generated by constructing and solving multiple constraint-satisfaction problems.

4. The method of claim 1, wherein the consistency of the driving specification is checked by checking the infeasibility of multiple constraint-satisfaction problems.

5. The method of claim 1, wherein the user can modify the driving specification on the graphical user interface, the method further comprising an additional step of modifying of the driving specification by the user on the graphical user interface.

6. The method of claim 1, wherein the method further comprises an additional step of retrieving the embedded source code as a data file.

* * * * *